United States Patent
Martin et al.

(10) Patent No.: US 9,297,702 B2
(45) Date of Patent: Mar. 29, 2016

(54) COHERENCE SWITCHING

(75) Inventors: Richard D. Martin, Newark, DE (US); Christopher A. Schuetz, Chadds Ford, PA (US); Dennis W. Prather, Newark, DE (US); Thomas E. Dillon, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 899 days.

(21) Appl. No.: 13/104,048

(22) Filed: May 10, 2011

(65) Prior Publication Data

US 2012/0288214 A1 Nov. 15, 2012

(51) Int. Cl.
| | |
|---|---|
| *G06K 9/40* | (2006.01) |
| *G01B 9/02* | (2006.01) |
| *G01J 9/00* | (2006.01) |
| *G01J 9/04* | (2006.01) |

(52) U.S. Cl.
CPC ..... *G01J 9/04* (2013.01); *G01J 9/00* (2013.01)

(58) Field of Classification Search
CPC .............................. G06T 5/001; G06T 3/4038
USPC .......................................... 382/254, 275, 284
See application file for complete search history.

(56) References Cited

U.S. PATENT DOCUMENTS

| | | | | |
|---|---|---|---|---|
| 4,854,677 A | * | 8/1989 | O'Meara ........................ | 359/242 |
| 4,913,547 A | * | 4/1990 | Moran ........................... | 356/489 |
| 6,304,330 B1 | * | 10/2001 | Millerd et al. ................. | 356/521 |
| 6,972,847 B2 | * | 12/2005 | Ina et al. ....................... | 356/497 |
| 6,992,778 B2 | * | 1/2006 | Nahum .......................... | 356/512 |
| 7,095,507 B1 | * | 8/2006 | Hwang et al. .................. | 356/512 |
| 7,187,492 B1 | * | 3/2007 | Shay ............................. | 359/349 |
| 7,209,239 B2 | * | 4/2007 | Hwang et al. .................. | 356/495 |
| 7,327,464 B2 | * | 2/2008 | Hwang et al. .................. | 356/495 |
| 8,362,946 B2 | * | 1/2013 | Bishop et al. ................. | 342/179 |
| 8,384,909 B2 | * | 2/2013 | Yun et al. ...................... | 356/497 |
| 2006/0159332 A1 | * | 7/2006 | Sawada ......................... | 382/141 |

OTHER PUBLICATIONS

Dillon et al., "Optical Configuration of an Upconverted Millimeter-Wave Distributed Aperture Imaging System", Proc. of SPIE vol. 7485, Millimetre Wave and Terahertz Sensors and Technology II, Sep. 24, 2009, pp. 1-12.*

Dillon et al., "Passive Millimeter Wave Imaging Using Distributed Aperture and Optical Upconversion", Proc. of SPIE vol. 7837, Millimetre Wave and Terahertz Sensors and Technology III, Oct. 12, 2010, pp. 1-8.*

Schuetz et al., "Radiometric Millimeter-Wave Detection via Optical Upconversion and Carrier Suppression", IEEE Transactions on Microwave Theory and Techniques, vol. 53 No. 5, May 2005, pp. 1732-1738.*

(Continued)

*Primary Examiner* — Matthew Bella
*Assistant Examiner* — Jose M Torres
(74) *Attorney, Agent, or Firm* — Panitch Schwarze Belisario & Nadel LLP

(57) ABSTRACT

A first image may be obtained using locked (relative) phases. A second image may be obtained using unlocked (e.g., randomized) phases. Data of the second image may be subtracted from data of the first image. The result may then undergo further processing, if desired, e.g., to further enhance the resulting image.

25 Claims, 4 Drawing Sheets

(56) References Cited

OTHER PUBLICATIONS

Koers et al., "Random Phase Pattern Creation for Speckle Reduction in Active Millimeter Wave Imaging Systems", in Proceedings of 4th ESA Workshop on Millimetre Wave Technology and Applications, 8th Topical Symposium on Millimetre Waves TSMMW2006, 7th MINT Millimeter-Wave International Symposium MINT-MIS (ESA, 2006), pp. 423-426.*

J.E. Kansky et al., "Beam control of a 2D polarization maintaining fiber optic phased array with high-fiber count," Proc. of SPIE, vol. 6306, 63060G; 2006.

* cited by examiner

COHERENCE SWITCHING

STATEMENT REGARDING FEDERALLY-SPONSORED RESEARCH

The U.S. Government has a paid-up license in this invention and the right in limited circumstances to require the patent owner to license others on reasonable terms as provided for by the terms of Contract No. N00173-08-C-2050, awarded by the U.S. Naval Research Laboratory.

FIELD

Various embodiments of the invention may relate to compensation for amplifier gain fluctuations in a distributed aperture imaging system based on controlling relative phases of detector channels.

BACKGROUND

Typical radiometric receivers may use a technique proposed by Robert Dicke, in which the receiver is rapidly switched between a known reference source and the scene being measured. This may allow for compensation of temporal variations in the gain of the low noise amplifier that is necessary due to the low signal levels being measured.

One obstacle to imaging in the millimeter and submillimeter wavelength bands, for example, is that the longer wavelengths of such bands may require larger apertures to achieve the resolutions typically desired in surveillance applications. As a result, lens-based focal plane systems may require large-aperture optics, which may severely limit the minimum achievable volume and weight of such systems. One approach to overcome this would be to use a distributed aperture detection scheme, in which the effective aperture size can be increased without the associated volumetric increase in imager size. A sparse, or distributed, aperture imaging system may use multiple (say, N) detectors to capture the phase and amplitude of the scene/object being imaged at each point. However, such systems, sometimes used, e.g., by the radio astronomy community, may require high frequency (30-300 GHz) signal routing and down conversion as well as large correlator banks.

In such systems, again, compensation for temporal variations in the gains of the low noise amplifiers of the receivers may be beneficial, e.g., due to the low signal levels being measured. Using a Dicke-type system for the multiple detector signals may be possible, but this would further increase the size and weight of the equipment and may also introduce additional difficulties, e.g., complexity and/or insertion losses.

SUMMARY OF EMBODIMENTS OF THE INVENTION

In various embodiments of the invention, the phases of the various channels, e.g., of a distributed aperture imaging system, may be scrambled in order to avoid coherent reconstruction. This may be referred to as "coherence switching." In some embodiments, coherence switching may also be used in down conversion of multiple channels by scrambling the phase of the local oscillator (LO) to each channel. A carrier associated with a respective detector may be varied between phase-scrambled and phase-locked states.

BRIEF DESCRIPTION OF THE DRAWINGS

Various embodiments of the invention are described below in conjunction with the accompanying drawings, in which.

DETAILED DESCRIPTION OF VARIOUS EMBODIMENTS

Figure 1:
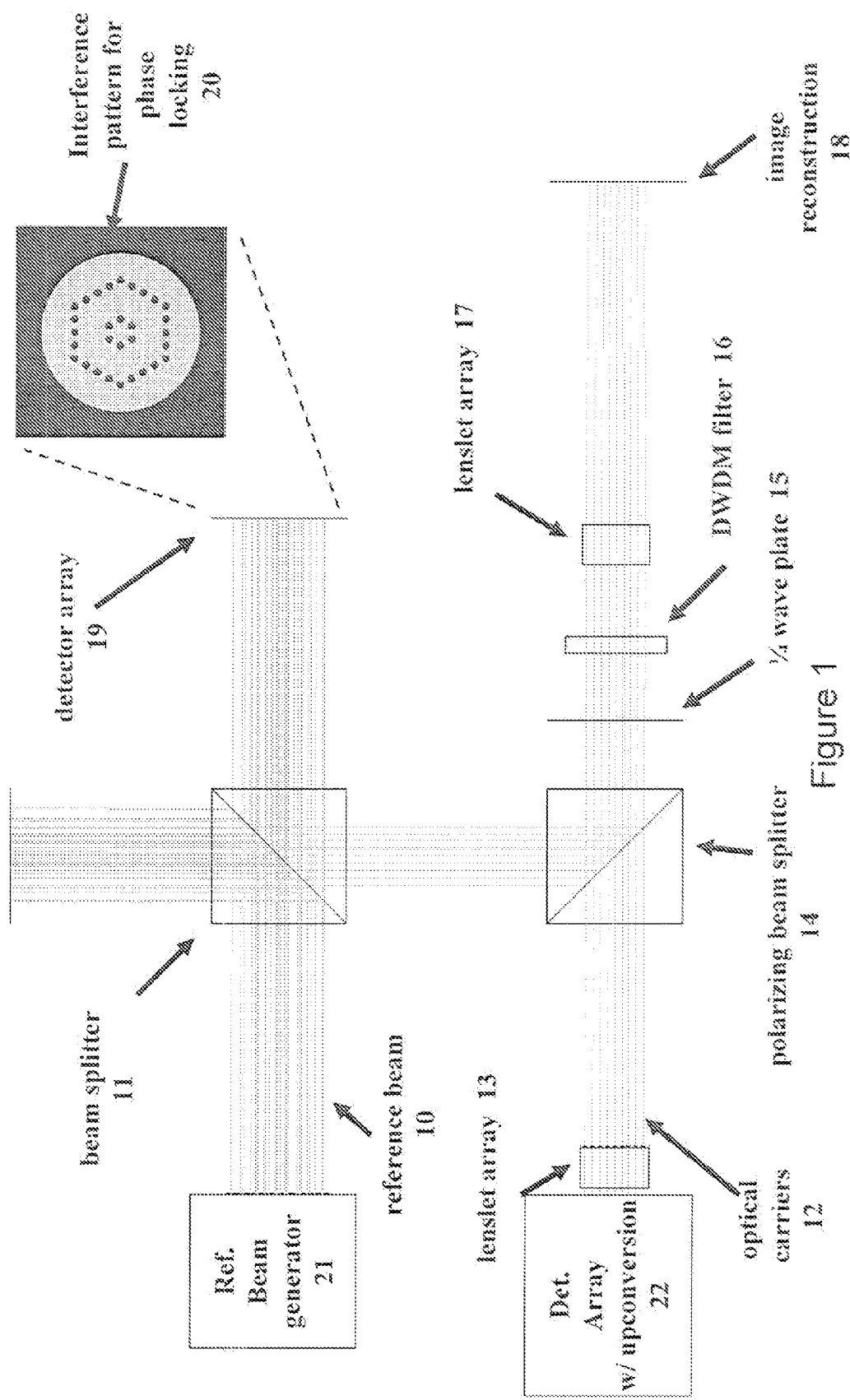
FIG. 1 is system in which various embodiments of the invention may be implemented.

Various embodiments of the invention may relate to the processing of millimeter-wave signals or other electromagnetic signals. The subsequent discussion will discuss millimeter wavelengths, but the invention is not limited to such wavelengths.

In some embodiments of the invention, millimeter wave (mmW) signals may be received in a distributed aperture array. In some embodiments of the invention, the outputs of the various (antenna) elements of the distributed aperture array may be upconverted to optical frequencies for further processing.

In the optical up-conversion process, which may be based on commercial electro-optic modulators, modulators may operate in a similar fashion to heterodyne mixers, by shifting the millimeter-wave radiation to another frequency. This shifting eases processing while preserving both amplitude and phase information of the captured signal. To verify the transfer of the complex millimeter-wave field to the optical domain, an understanding of the components of the optical modulation process may be helpful.

Electro-optic modulation may convert energy into the sidebands of an optical carrier signal by imposing a phase change, $\Delta\phi$, to the optical field proportional to the applied millimeter-wave field described by Equation (1), as follows:

$$\Delta\phi = mE_{mmW}\cos(\omega_{mmW}t + \phi_{mmW}), \quad (1)$$

where m is a modulation constant dependent on the properties of the modulator and the efficiency of the collection antenna, and $E_{mmW}$, $\omega_{mmW}$ and $\phi_{mmW}$ are the strength, frequency, and phase of the incident millimeter-wave field, respectively. Thus, the output field $E_o$, of the electro-optic modulator may be described in Equation (2), as follows:

$$E_0 = E_{opt}e^{j(\omega_{opt}t + \Delta\phi + \phi_{opt})} = E_{opt}e^{j\omega_{opt}t + jmE_{mmW}\cos(\omega_{mmW}t + \phi_{mmW}) + j\phi_{opt}}, \quad (2)$$

where $E_{opt}e^{j(\omega_{opt}t + \phi_{opt})}$ describes the optical field incident on the modulator. Using Fourier expansion techniques and assuming a small imposed millimeter-wave field, the field strength of the imposed first-order sideband may be shown as:

$$E_{0,FSB} = \frac{jmE_{opt}}{2}E_{mmW}e^{j(\omega_{opt} + \omega_{mmW}) + j(\Delta\phi + \phi_{opt})}, \quad (3)$$

The above Equation (3) can be interpreted as the initial complex millimeter-wave field scaled in amplitude by a factor $mE_{opt}/2$ and in wavelength by a factor $\omega_{mmW}/(\omega_{opt} + \omega_{mmW})$. In addition, a phase component due to the optical path length may be included. Wavelength scaling may allow smaller components, such as fiber optic waveguides, to replace bulky coaxial or metallic waveguides. The amplitude scaling, for reasonable optical powers, can be close to unity, and low-noise photo detectors may enable the detection of low power millimeter-wave signals.

While the above discussion refers to optical up-conversion, in some embodiments of the invention, directed to other types of systems, down-conversion may be used instead.

In embodiments of the present invention, the phases of the optical carriers may be of particular interest. In particular, FIG. 1 shows a conceptual block diagram of a system in which various embodiments of the invention may be implemented. The exemplary implementation of FIG. 1 shows a detector array 22 that may capture millimeter wave energy and may up-convert (e.g., optically) the corresponding signal onto an optical carrier. The resulting output of detector array 22 may be an optical fiber carrier 12 for each respective detector channel, which may contain one or more components from a distributed-aperture imaging system; however, the invention is not limited thereto (for example, embodiments of the invention may also be used with other types of pupil plane imaging systems). In the embodiment of FIG. 1, the fiber carriers 12 may be fed through a lenslet array 13, whose output may be fed into a polarizing beam splitter 14. Polarizing beam splitter 14 may provide input to a further beam splitter 11, which will be discussed further below. Outputs of polarizing beam splitter 14 may be fed through a ¼-wave plate 15, a dense wave-division multiplexing (DWDM) filter 16, and a further lenslet array 17, which may thereby provide for coherent image reconstruction 18, based, e.g., on the millimeter wave sidebands.

Also in FIG. 1, a reference beam generator 21 may generate a reference beam 10 that may be used as a phase reference. This reference beam 10 may be generated from the same optical source used to generate the optical carriers used by detector array 22 and may thus be made coherent with the optical carriers 12. However, the invention is not thus limited; on the contrary, other embodiments are envisioned in which, for example, the optical carriers are generated by the reference beam generator 21, or in which, for example, both detector array 22 and reference beam generator 21 receive inputs from a source external to both (not shown). Furthermore, each of blocks 21 and 22 may generate its own carriers, and there may be communication between the two to make the resulting optical carriers coherent with each other.

An optical source for such apparatuses may include, but is not limited to, lasers, laser diodes, light-emitting diodes, etc., and may also include, e.g., modulation and/or frequency/wavelength conversion components. For example, such modulation components may include, but are not limited to, phase modulation components.

The reference beam may be fed into a beam splitter 11, which may also receive an output of polarizing beam splitter 14, in which the optical carriers from lenslet array 13 may be combined with and/or interfered with reference beam 10.

As discussed in co-pending U.S. patent application Ser. No. 12/762,804 (hereinafter referred to as "the '804 application"), filed on Apr. 19, 2010, and incorporated by reference herein in its entirety, an output of beam splitter 11 may be fed to a defector array 19, which may be used to detect an interference pattern 20 that may be used for phase locking of the optical carriers from the detector array with optical up-conversion 22. In such a system, feedback may be provided to the up-conversion module 22 to adjust the relative phases of the optical carriers.

In various embodiments of the invention, the phase locking may operate in two modes. In the first mode, the phases of the respective optical carriers are kept locked at a fixed phase relative to the reference beam 10. In the second mode, the relative phases of the optical carriers are no longer locked but are, instead, permitted to vary or are intentionally scrambled. This may done, for example, by shutting off the phase-locking aspects (e.g., eliminating the feedback to up-conversion module 22 and/or shutting off or blocking reference beam 10 and still attempting to phase lock each channel). Another way in which this may be done is by switching within up-conversion module 22, by generating a random phase component (e.g., using a random phase generating device, which may, e.g., be based on a random number generator, that generates a number (i.e., phase value) between 0 and $2\pi$ radians) for the respective optical carriers. This may be accomplished, e.g., by obtaining a random phase value and modulating it onto a carrier or by means of a corresponding (relative) time delay.

In embodiments of the invention, the phase control may be switched between the first and second modes, and images may be captured 18 in both modes. The image data captured in the second mode may then be subtracted from the image data obtained using the first mode. This subtraction may be performed, e.g., on a pixel-by-pixel basis. Further processing may also be performed on the result of the subtraction to obtain an image compensated for, e.g., temporal gain variations.

In an exemplary embodiment of the invention, a reference frame may be obtained in the second mode for each scene frame obtained in the first mode. In other exemplary embodiments, a single reference frame may be used in conjunction with multiple scene frames. In embodiments of the invention, the frequency with which switching between the two modes may be chosen so as to obtain as many frames per second as possible while having sufficiently long integration (frame) times to permit satisfactory operation; this may be determined empirically and/or based on equipment specifications. In yet further embodiments of the invention, compensated frames (i.e., those for which the data obtained in the second mode has been subtracted from the data obtained in the first mode) may be temporally averaged, which may serve to reduce noise.

While the above embodiments discuss that the reference beam 10 phases may be randomized in the second mode, in further embodiments of the invention, phases of the optical carriers used in fiber sources 12 to convey image data may, alternatively, be randomized in the second mode, or phases of both may be randomized. Such randomization may occur at the reference beam generator 21 and/or at the detector array 22 and/or at some device or devices external to one or both (not shown).

In further embodiments of the invention, a common optical modulation apparatus may be used to perform optical up-conversion, phase-locking, and scrambling.

Figure 2:
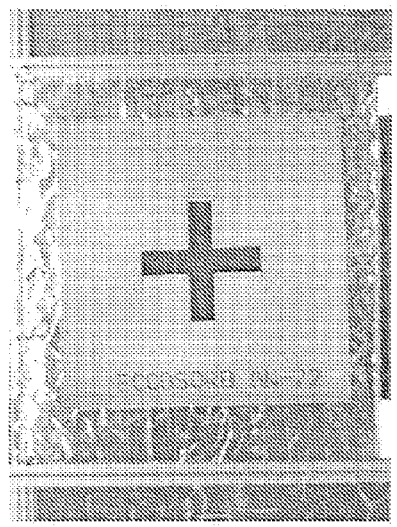
FIG. 2 shows an object used in an example of an application according to an embodiment of the invention.
Figure 3C:
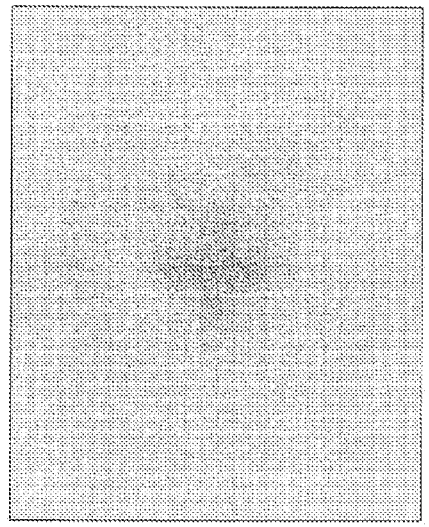
FIG. 3C shows a further image according to an embodiment of the invention.
Figure 3B:
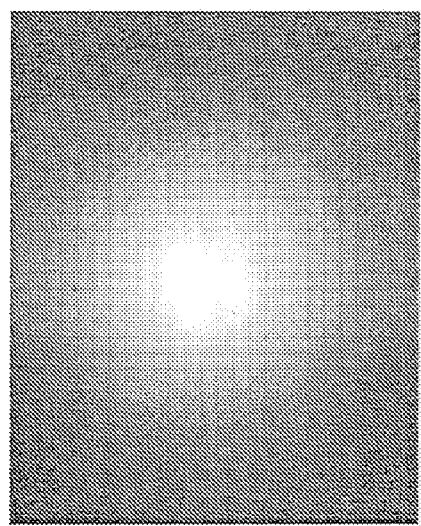
FIGS. 3A and 3B show images obtained according to an embodiment of the invention.
Figure 3A:
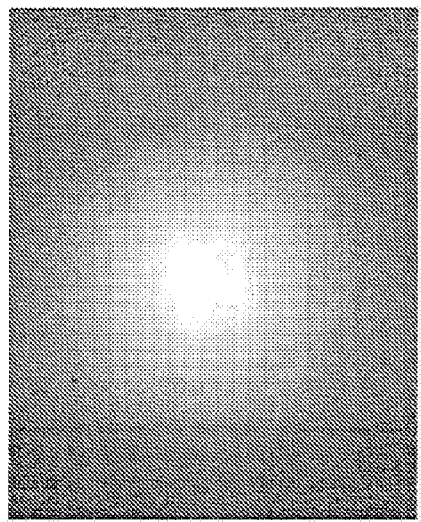
Figure 4:
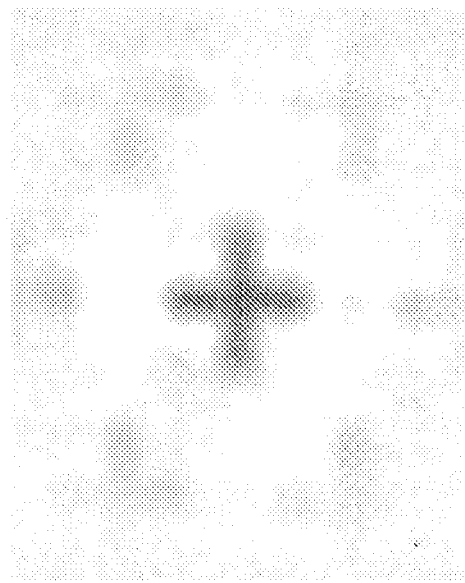
FIG. 4 shows a result of processing the images of FIGS. 3A and 3B, according to an embodiment of the invention.

As an example, one may consider the object shown in FIG. 2, which shows a cross-shaped aperture that permits the passage of millimeter waves. One may obtain a phase-locked image, using the first mode described above, which may appear similar to FIG. 3A. One may then switch to the second mode described above, in which relative phases are not locked, and may obtain an image that may appear similar to FIG. 3B. The data corresponding to the image of FIG. 3B may be subtracted from the data corresponding to the image of FIG. 3A to yield the data corresponding to the image of FIG. 3C. Further processing, which may, for example, include, but is not limited to, subtraction of background noise (e.g., due to optics) and/or spatial convolution, may be performed. The result may appear as shown in FIG. 4.

Figure 5:
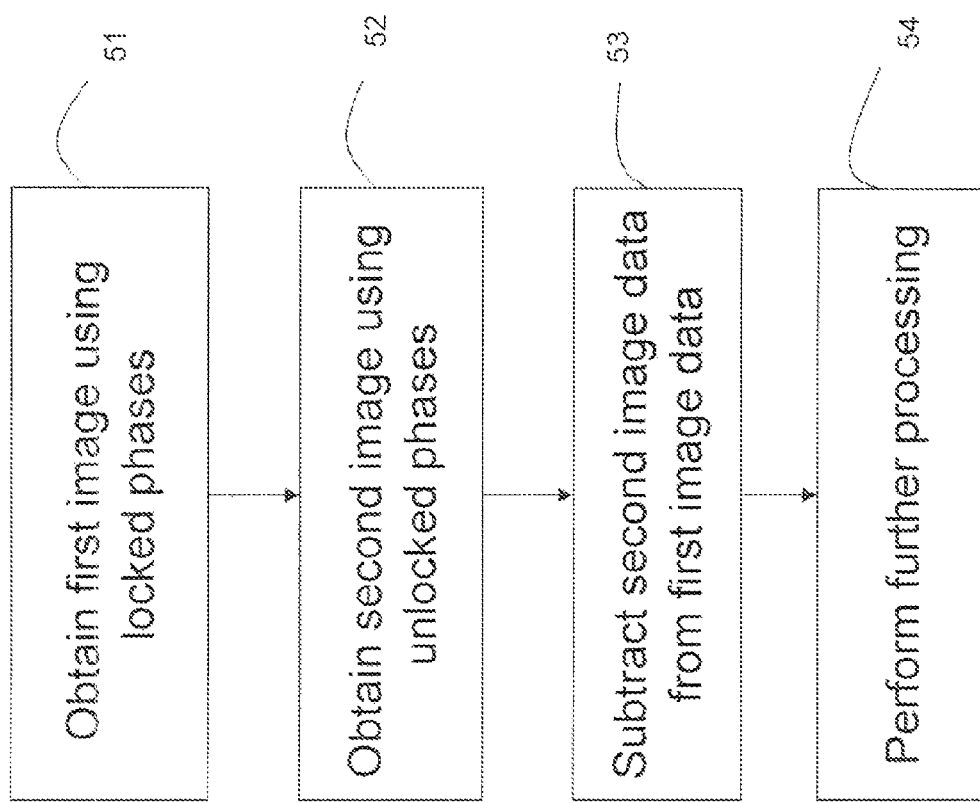
FIG. 5 shows a flowchart of a method according to an embodiment of the invention.

The above process is summarized in the flowchart of FIG. 5, according to an embodiment of the invention. A first image may be obtained 51 using locked (relative) phases. A second image may be obtained 52 using unlocked (e.g., randomized) phases. Data of the second image may be subtracted from data of the first image 53. The result may then undergo further processing 54, if desired, e.g., to further enhance the resulting image.

Various embodiments of the invention have how been discussed in detail; however, the invention should not be understood as being limited to these embodiments. It should also be appreciated that various modifications, adaptations, and alternative embodiments thereof may be made within the scope and spirit of the present invention.

What is claimed is:

1. A method of multi-aperture image processing, comprising:
   obtaining first image data, wherein the first image data is obtained using inputs from multiple apertures, which inputs are up-converted to optical frequencies using respective optical signals that are phase-locked with respect to one another;
   obtaining second image data, wherein the second image data is obtained using inputs from the multiple apertures, which inputs are up-converted to optical frequencies using respective optical signals that are not phase-locked with respect to one another;
   subtracting the second image data from the first image data to obtain output image data;
   obtaining at least third image data, wherein the at least third image data is obtained using inputs from the multiple apertures, which inputs are up-converted to optical frequencies using respective optical signals that are phase-locked with respect to one another; and
   subtracting the second image data from the at least third image data to obtain at least second output image data.

2. The method of claim 1, further comprising temporally averaging the output image data and the at least second output image data.

3. A method of multi-aperture image processing, comprising:
   obtaining first image data, wherein the first image data is obtained using inputs from multiple apertures, which inputs are up-converted to optical frequencies using respective optical signals that are phase-locked with respect to one another;
   obtaining second image data, wherein the second image data is obtained using inputs from the multiple apertures, which inputs are up-converted to optical frequencies using respective optical signals that are not phase-locked with respect to one another; and
   subtracting the second image data from the first image data to obtain output image data,
   wherein the non-phase-locked optical signals comprise optical signals whose phases are randomized.

4. The method of claim 3, further comprising:
   performing further processing on the output image data to obtain processed output image data.

5. The method of claim 4, wherein the further processing includes subtracting background noise from the output image data.

6. The method of claim 4, wherein the further processing includes performing a spatial convolution on the output image data.

7. The method of claim 3, wherein the optical signals comprise optical carrier signals on which image input data is carried.

8. The method of claim 3, wherein the optical signals comprise a reference beam comprising reference optical signals corresponding to optical carrier signals on which input image data is carried.

9. The method of claim 3, wherein the inputs used to obtain the first image data and second image data correspond to a common scene.

10. A method of multi-aperture image processing, comprising:
    obtaining first image data, wherein the first image data is obtained using inputs from multiple apertures, which inputs are up-converted to optical frequencies using respective optical signals that are phase-locked with respect to one another;
    obtaining second image data, wherein the second image data is obtained using inputs from the multiple apertures, which inputs are up-converted to optical frequencies using respective optical signals that are not phase-locked with respect to one another;
    subtracting the second image data from the first image data to obtain output image data; and
    blocking or shutting off a feedback mechanism configured to provide for phase-locking to obtain the non-phase-locked optical signals.

11. An optical-based image processing apparatus, comprising:
    a reference beam generator configured to generate a plurality of optical reference signals and configured to be switched between a phase-locked mode, in which the optical reference signals are phase-locked with respect to a corresponding plurality of optical carrier signals, and a non-phase-locked mode, in which the optical reference signals are not phase-locked with respect to the corresponding plurality of optical carrier signals;
    a beam splitter configured to receive the optical reference signals and to receive the plurality of optical carrier signals modulated with input image data, wherein wavelengths of the optical carrier signals correspond to wavelengths of the optical reference signals, wherein the beam splitter is further configured to provide at least one output to a detector to provide feedback to the reference beam generator and/or to an apparatus configured to generate the plurality of optical carrier signals; and
    an image reconstruction apparatus configured to obtain an image from the plurality of optical carrier signals modulated with input image data,
    wherein the image reconstruction apparatus is configured to obtain at least one set of first image data in the phase-locked mode and at least one second set of image data in the non-phase-locked mode and is further configured to subtract the at least second image data from the at least first image data.

12. The apparatus of claim 11, wherein the reference beam generator comprises at least one random phase generator configured to provide one or more random phases during the non-phase-locked mode.

13. The apparatus of claim 12, wherein the one or more random phases are applied to one or more of the optical reference signals.

14. The apparatus of claim 11, wherein the feedback is blocked or shut off during said non-phase-locked mode.

15. The apparatus of claim 11, wherein the reference beam generator is further configured to generate the set of optical carrier signals.

16. The apparatus of claim 11, further comprising at least one random phase generator configured to provide one or more random phases during the non-phase-locked mode, and wherein the at least one random phase generator is configured to apply the one or more random phases to one or more of the optical carrier signals and/or to one or more of the optical reference signals.

17. The apparatus of claim 11, wherein the input image data in the phase-locked mode and the input image data in the non-phase-locked mode correspond to a common scene.

18. The apparatus of claim 11, wherein the apparatus configured to generate the plurality of optical carrier signals comprises at least one random phase generator configured to provide one or more random phases during the non-phase-locked mode.

19. The apparatus of claim 18, wherein the one or more random phases are applied to one or more of the optical carrier signals.

20. A millimeter-wave image processing apparatus comprising the apparatus of claim 11 and a millimeter-wave detector array configured to detect and provide the input image data.

21. A distributed-aperture image processing apparatus comprising the apparatus of claim 11 and a distributed-aperture detector array configured to detect and provide the input image data.

22. A millimeter-wave image processing method comprising the method of claim 3, and further comprising performing millimeter-wave array detection to detect and provide the inputs.

23. A distributed-aperture image processing method comprising the method of claim 3, and further comprising performing distributed-aperture detection to detect and provide the inputs.

24. A millimeter-wave image processing method comprising the method of claim 1 and further comprising performing millimeter-wave detection to detect and provide the inputs.

25. A distributed-aperture image processing method comprising the method of claim 1 and further comprising performing distributed-aperture detection to detect and provide the inputs.

* * * * *